United States Patent [19]
Chen

[11] Patent Number: 5,515,433
[45] Date of Patent: May 7, 1996

[54] RESISTANCE FORWARD TELEPHONE LINE FEED CIRCUIT

[75] Inventor: William I. H. Chen, Bedford, Tex.

[73] Assignee: Reltec Corporation, Cleveland, Ohio

[21] Appl. No.: 298,146

[22] Filed: Aug. 30, 1994

[51] Int. Cl.$^6$ .................................................. H04M 1/76
[52] U.S. Cl. ........................ 379/398; 379/413; 379/402; 379/378; 379/405
[58] Field of Search .................. 379/412, 331, 379/405, 393, 402, 413, 378; 361/118, 119, 784; 336/208

[56] References Cited

U.S. PATENT DOCUMENTS

| | | | |
|---|---|---|---|
| 3,627,952 | 12/1971 | Person | 379/399 |
| 3,714,548 | 1/1973 | Macrander | 323/356 |
| 3,781,483 | 12/1973 | Deisch | 379/378 |
| 3,934,099 | 1/1976 | Elder, Jr. | 379/402 |
| 4,103,112 | 7/1978 | Korsky | 379/378 |
| 4,110,636 | 8/1978 | Dijkmans | 327/310 |
| 4,132,863 | 1/1979 | Smith | 379/400 |
| 4,241,239 | 12/1980 | Pernyeszi | 379/413 |
| 4,250,479 | 2/1981 | Bausch et al. | 336/208 |
| 4,431,869 | 2/1984 | Sweet | 379/413 |
| 4,440,979 | 4/1984 | McGibbon et al. | 379/351 |
| 4,484,032 | 11/1984 | Rosenbaum | 379/345 |
| 4,503,289 | 3/1985 | Spires | 379/345 |
| 4,607,142 | 8/1986 | Martin | 379/407 |
| 4,682,355 | 7/1987 | Bailly et al. | 379/413 |
| 4,803,718 | 2/1989 | Neil et al. | 379/393 |
| 4,829,567 | 5/1989 | Moisin | 379/405 |
| 4,864,609 | 9/1989 | Moisin | 379/413 |
| 4,899,382 | 2/1990 | Gartner | 379/413 |
| 4,922,531 | 5/1990 | Moisin | 379/413 |
| 4,982,426 | 1/1991 | Jakab | 379/402 |
| 5,109,409 | 4/1992 | Bomgardner et al. | 379/377 |
| 5,255,317 | 10/1993 | Arai et al. | 379/402 |
| 5,274,704 | 12/1993 | Jakab | 379/403 |
| 5,307,241 | 4/1994 | Pistilli | 361/784 |
| 5,333,196 | 7/1994 | Jakab | 379/402 |
| 5,373,554 | 12/1994 | Sato | 379/413 |

Primary Examiner—Jeffery Hofsass
Assistant Examiner—Scott Wolinsky
Attorney, Agent, or Firm—Richards, Medlock & Andrews

[57] ABSTRACT

A line feed circuit employing a low-inductance transformer, and providing a major portion of the terminating impedance as line feed resistors connected between a telephone line and the transformer primary. A low impedance output amplifier drives a low resistance transformer secondary, thus reducing the need for large transformer inductances. By connecting the line feed resistors between the transformer and the telephone line, high voltage surges are absorbed by the resistors, and thus little is dissipated in the transformer. The transformer can be made physically small, because of the reduced inductance, reduced winding insulation, and reduced power requirements. The resistance forward type of line feed circuit lends itself well to simple implementation with flux cancellation and impedance synthesis circuits.

20 Claims, 6 Drawing Sheets

RESISTANCE FORWARD TELEPHONE LINE FEED CIRCUIT

TECHNICAL FIELD OF THE INVENTION

The present invention relates in general to telephone interface circuits, and more particularly relates to circuits for interfacing telephone lines to transmit-receive hybrids, to telephone line battery feed circuits and to signal sensing circuits as well as terminating impedances for the telephone line.

BACKGROUND OF THE INVENTION

There are numerous types of telephone line feed circuits to accommodate a number of different criteria as well as to satisfy or focus on various constraints peculiar to particular situations. Of significant interest to substantially every type of telephone line feed circuit is the capability of providing two-way voice communications while maintaining a substantially large trans-hybrid loss, adequate return loss and proper impedance matching without loss of signal strength over a band of desired frequencies. Other concerns involve designs that adequately protect the telephone line feed circuit against damage due to adverse voltages, such as lightning strikes to the line.

A number of telephone line feed circuits are entirely transformerless, and include only resistors, capacitors and solid state components. While this type of feed circuit can be characterized by a small size, they require rather closely-matched resistors and other components, thereby making the circuit very costly. Also, the power consumption of the transformerless type of hybrid can be quite substantial. Another limitation inherent in transformerless line feed circuits is the inability to operate completely between the power supply rails, e.g. a headroom limitation. Typically, transformerless solid state line feed circuits have a voltage operating range of about 8 volts less than the difference between the power supply rails. This reduced range of operating voltage limits the use of such type of line feed circuits to shorter loop lengths, as compared to line feed circuits that utilize transformers. Also, transformerless line feed circuits have a shortcoming in that they cannot sink telephone line current.

In telephone line feed circuits employing transformers, the designs can be less costly, but generally at the expense of the size of components. With larger components, this reduces the number of line feed circuits that can be assembled on a printed circuit board of reasonable size. The typical line transformer is a 1:1 transformer which must maintain a magnetizing inductance greater than 1.5 Henry while carrying 50mA in its primary winding. The physical dimensions are typically 3.4cm ×3.2cm ×1.4cm (1.33 inch ×1.25 inch ×0.55 inch).

As an apparent attempt to overcome the transformer size problem, U.S. Pat. No. 4,982,426 by Jakab discloses a two-transformer telecommunication line interface circuit that utilizes a small transformer wound with a resistance wire, and with the secondary thereof driven by a low impedance amplifier. It is difficult to realize exactly the required termination impedance, for example, 900 Ohm, in the resistance windings. Thus, the resistance of the resistance windings is made at a convenient value less than the 900 Ohm. External resistors are then used to pad out the total series resistance to exactly 900 Ohms. By utilizing a majority of the terminating resistance in the windings of the transformer, excessive power is dissipated in the transformer when subjected to over voltage conditions, resulting in failure of transformer. While it is preferable, and often required, a component failure should result in an open circuit. Transformer failures often result in a short circuit of the windings. Although the transformer inductance is made smaller, e.g., 0.25 Henry for the primary inductance and 1.0 Henry for the secondary inductance, the patented telecommunication line interface circuit still has several deficiencies. First, the prior art line interface circuit requires two transformers, one being about 2 cm×2 cm×1.78 cm, and the other about 1 cm×1 cm×1 cm, totalling about 8.1 cm$^3$. Secondly, because the transformer primary windings are wound with the resistance-type conductors, a large part of the power loss due to the line feed current is generated internal to the transformer. The power dissipated is by way of heat, which is a mechanism that deteriorates transformers over time. Thirdly, because the current-limiting resistance of the transformer is internal thereto, voltage surges due to lightning appear directly across the transformer primary. The insulation between the windings must be adequate to withstand voltages caused by lightning strikes to the telephone line. In addition, the windings must be able to survive and dissipate the considerable surge energy without damage.

In U.S. Pat. No. 4,484,032 by Rosenbaum, an active impedance transformer assisted line feed circuit utilizes resistors connected to the transformer primary windings so that electrical surges due to lightning are effectively reduced before the energy reaches the transformer. Although the Rosenbaum line feed circuit utilizes a transformer for sensing line currents, it otherwise is a solid state line feed circuit that suffers from the headroom limitation noted above. The current sensing transformer facilitates common mode rejection and is used for AC impedance synthesis purposes.

U.S. Pat. No. 4,864,609 by Moisin discloses a telephone line interface circuit where a portion of the terminating impedance to the line constitutes resistors in the transformer primary, and the remaining terminating impedance resides in the electronic hybrid circuit. Despite that the primary of the transformer includes a portion of the terminating impedance, the inductance of the transformer primary winding is required to be about 1.7 Henry in order to provide a sufficient bandwidth at low voice frequencies. Moisin considers the resistors in the transformer primary circuit to be disadvantageous for one purpose, but helpful for another purpose, and thus utilizes impedance compensation techniques to effectively reduce the value of the line resistors.

U.S. Pat. No. 4,503,289 by Spires discloses a telephone line circuit having a resistor in the primary winding for sensing DC line currents. A compensation circuit requires an additional transformer winding for sensing the primary current and providing a compensated signal to the secondary winding to reduce the overall flux in the transformer core due to DC currents. An amplifier arrangement is provided for sensing voice signals across the tip and ring line, and coupling the signals to a transconductance amplifier to control the current delivered to the transformer secondary, thereby providing the proper AC terminating impedance for the tip and ring line. The Spires line feed circuit senses the line voltages and drives the transformer secondary with a current to synthesize a desired impedance. Because the transformer has a relatively large inductance (2 Henries), a voltage sense and current drive technique of impedance synthesis is acceptable.

Although the foregoing prior art illustrates the efforts to design telephone line feed circuits with smaller size transformers, additional advancements are possible in order to further reduce the size of the transformer component without sacrificing surge immunity and thereby allow a larger number of line interface circuits per unit of circuit board area. It can be seen that a need exists for further improvements in circuit design techniques for reducing the size of the transformer component, without compromising the other characteristics required, such as proper line terminating impedance, lightning protection, frequency response, line current capability, heat dissipation in the transformer, etc.

SUMMARY OF THE INVENTION

In accordance with the invention, a telephone line feed circuit is characterized by a design that minimizes the inductance of the transformer and thus the size thereof. According to a preferred embodiment of the invention, there is disclosed a line feed circuit having a low resistance transformer secondary driven by a low output impedance amplifier, and a low resistance transformer primary coupled to the telephone tip and ring lines by respective forward-located line feed resistors. The line feed resistors constitute a major portion of the terminating impedance, as well as provide voltage surge isolation to the transformer, such as caused by lightning. Both the transformer primary and secondary windings are wound with low-resistance conductors so as to minimize the heat energy generated, i.e., the heat generated internal to the transformer, and thus extend the life thereof.

In accordance with a significant advantage of the telephone line feed circuit of the invention, the low impedance output amplifier is utilized to drive the low resistance transformer secondary, thereby reducing the inductance required by the transformer, and thus allowing the size to be reduced. In the preferred form of the invention, the inductance of the transformer need be no more than about 0.08–0.12 Henry with a secondary winding resistance of only about 30–35 ohms. The transformer secondary winding is wound first on a bobbin, and then the bifilar primary is wound thereover. This further facilitates reduction of the transformer secondary resistance.

In accordance with another embodiment of the invention, only a single line feed transformer is required in the line feed circuit, and which need be no larger than about 1.3cm×1.3cm×1.3cm (0.5 inch×0.5 inch, by 0.5 inch). With such a small size transformer, less space is required on a printed circuit board, and the cost of the transformer and the feed circuit is reduced.

In accordance with another feature of the invention, a flux cancellation circuit is employed to reduce the DC magnetic flux in the core of the transformer due to DC line currents that power the telephone line during voice communications. A current sensing amplifier senses both voice signals and DC line feed currents across the forward resistors to provide the voice signals to a hybrid transmit amplifier, and to provide through an integrator circuit a bias voltage to the low impedance output hybrid receive amplifier. In this manner, the receive amplifier provides a compensating DC current in the transformer secondary to offset the line feed current in the primary. The respective transformer magnetic fluxes caused by the DC currents thereby cancel each other.

In yet another embodiment of the invention, the line feed resistors can be reduced in value, and an impedance synthesis network can be provided to drive the hybrid receive amplifier to provide signals to the transformer secondary which, when reflected to the primary, provide the desired characteristic impedance to the line. Such a circuit is ideally suited to telephone lines having reduced battery voltages, but yet maintains the appropriate line currents in view of the reduced value feed resistors. However, with the impedance synthesis network, the standard characteristic impedance presented to the telephone line is maintained.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, elements or functions throughout the views, and in which.

DETAILED DESCRIPTION OF THE INVENTION

While the invention described below is particularly well adapted for use with two-wire current-sourcing interface circuits, as in central office (or PBX) line cards or in loop-carrier Remote Terminal (RT) line cards, the invention can also be adapted to function in two-wire current-sinking interface circuits, such as in loop-carrier Central Office Terminal (COT) line cards. Also, those skilled in the art may find one or more features of the invention applicable to certain situations, without utilizing the other features described herein.

Figure 1:
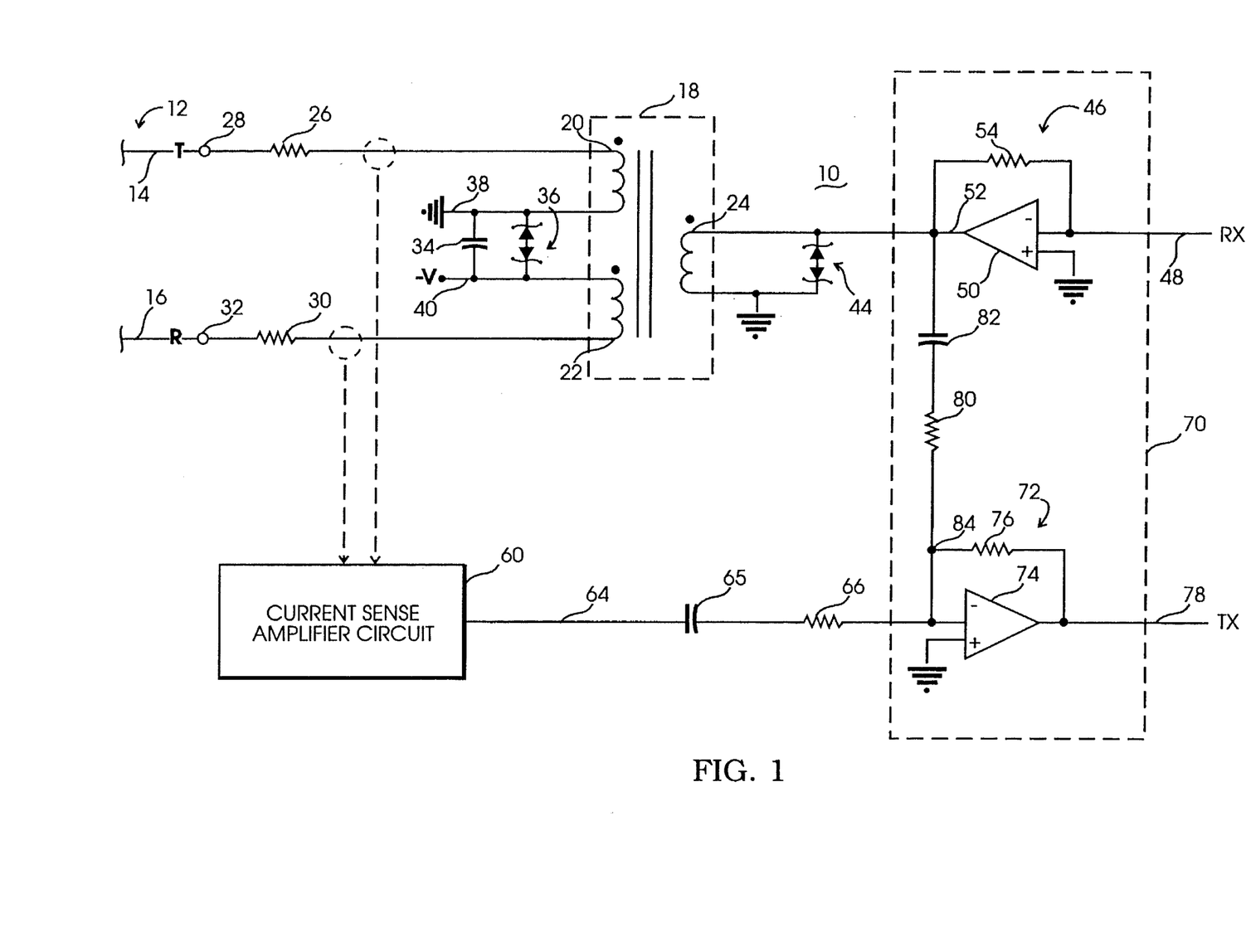
FIG. 1 is an electrical schematic drawing of the resistance forward line feed circuit according to the invention.

With reference now to FIG. 1, there is illustrated a two-wire line interface circuit 10 adapted for providing a battery feed voltage to a telephone line 12, shown as a tip conductor 14 and a ring conductor 16. According to a significant feature of the invention, the line interface circuit 10 includes a single transformer 18 having a split primary with a first winding 20 and a second winding 22 having polarities in the manner shown. The transformer 18 has a single secondary winding identified as reference numeral 24. As used herein, the "primary" refers to the telephone side of the line feed transformer 18, and the "secondary" refers to the equipment side of the transformer. The transformer primary/secondary turns ratio is preferably about 1:1, but can be other ratios. As will be described in more detail below, the circuit configuration of the line interface circuit 10 allows the transformer 18 to require only a small inductance, thus reducing the overall component size of the transformer 18.

In accordance with another feature of the invention, a forward battery feed resistor 26 is connected in series between a telephone line tip conductor terminal 28 and the transformer primary winding 20. A second forward battery feed resistor 30 is connected between a telephone line ring conductor terminal 32 and the other transformer primary winding 22. The battery feed resistors 26 and 30 provide a major portion of the terminating impedance of the telephone line 12, as well as provide voltage surge protection to the transformer 18, due to possible lightning strikes on the telephone line 12. As will be described more thoroughly below, because the transformer secondary 24 is driven by a very low impedance source, a low impedance is reflected from the transformer secondary 24 to the split primary, and thus the battery feed resistors 26 and 30 function together with the resistance of the transformer primary windings 20 and 22 as the terminating impedance for the telephone line 12.

A capacitor 34 is connected between the remaining conductors of the transformer primary windings 20 and 22, and functions to bypass transient currents in the tip and ring telephone line 12 to ground, such as shown by the connection to the transformer winding conductor 38. Transformer winding conductor 40 is shown connected to a negative battery feed voltage (–V), which in many cases may be the –48 volts of switching system supply voltages. The battery voltage –V provides the battery feed through the forward line feed resistors 26 and 30 to the telephone line 12. A pair of zener diodes 36, poled in the manner shown in FIG. 1, serve to protect the capacitor 34 against over voltage conditions that may exist as surges on the telephone line 12. The secondary winding 24 of the transformer 18 is optionally protected with a pair of zener diodes 44.

A receive amplifier circuit 46 receives voice or other signals from a receive line (RX) 48 and drives the transformer secondary 24 to thereby drive the telephone line 12 with such signals. The receive amplifier circuit 46 includes a differential or other type of amplifier 50 having a low impedance output 52 connected to the transformer secondary 24. The amplifier 50 is shown with a feedback resistor 54 to provide a desired gain to the signals received on the RX conductor 48. It can be understood by those skilled in the art, that the transformer secondary circuit driven by the receive amplifier 50 constitutes a high-pass filter, with the resistance of the secondary winding 24, and the resistance of the primary windings 20 and 22, as well as the battery feed resistors 26 and 30 being effectively in series with the output 52 of the receive amplifier 50. Further, the inductance of the transformer 18 represents an inductance that shunts the signals to ground, thus defining a high-pass filter. In order for the telephone line feed circuit 10 of the invention to adequately pass the lower frequencies in the voice band, i.e., about 300 Hz, the L/R time constant of the resistance of the transformer secondary 24 and the inductance of the transformer 18 should be about three milliseconds or more, to maintain adequate transmission impedance and frequency response. Because the transformer secondary 24 and the output impedance of the receive amplifier 50 is very low, i.e., about 30–50 ohms, the transformer inductance can also be very small to maintain the requisite low frequency response capabilities. In the preferred embodiment of the invention, the inductance of the transformer 18 is only about 0.1 Henry, which is about an order of magnitude smaller than conventional line interface circuit transformers that have higher impedance secondary circuits.

Although the magnetizing inductance of the transformer 18 is driven by the low impedance output of the amplifier 50, this will drain some signal current from the amplifier output, but will otherwise have little or no effect on either the transmission frequency response or the output impedance.

A current sense amplifier circuit 60 functions to sense the DC current condition on the telephone line 12, due to on-hook or off-hook conditions, as well as sense the much smaller amplitude bidirectional voice signals that are transmitted between the line feed circuit 10 and the telephone line 12.

When the remote equipment (not shown) connected to the telephone line 12 is placed in an off-hook condition, the line current flows from ground 38, through the transformer split primary 20, the forward line feed resistor 26, the telephone line tip conductor 14, the remote equipment, the telephone line ring conductor 16, the other forward line feed resistor 30, the other transformer split primary 22, and to the negative battery supply voltage (–v) 40. Line current flowing through the forward line feed resistors 26 and 30 can be sensed by the current sense amplifier circuit 60, and provide logic or voltage conditions indicating the state of the line. During an on-hook condition, the telephone line 12 is open circuited, and thus no current flows through the line feed resistors 26 and 30. During this condition, the current sense amplifier circuit 60 can provide appropriate signalling voltages.

Figure 2:
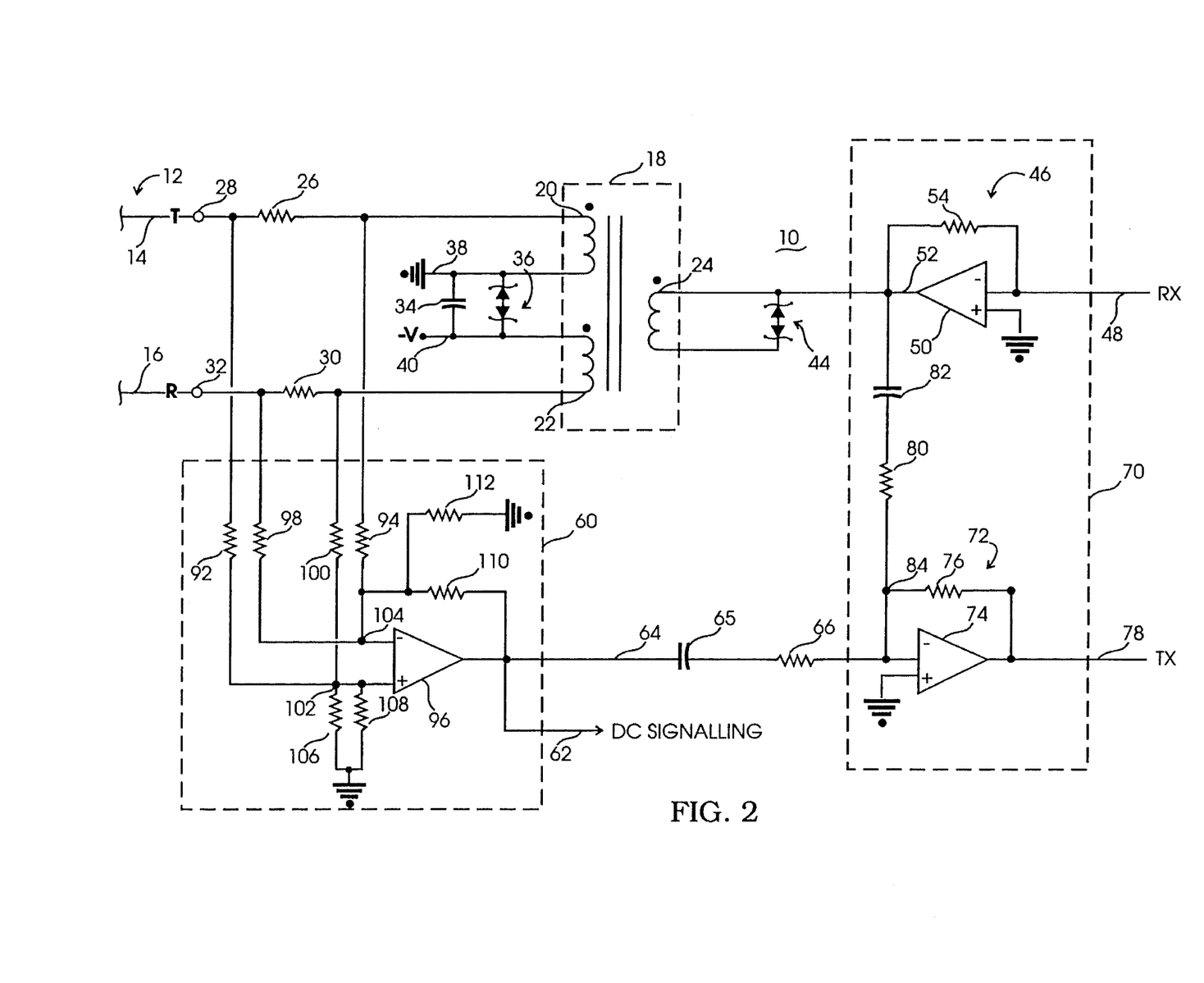
FIG. 2 is a telephone line feed circuit similar to FIG. 1, but including a resistor/amplifier type of current sense circuit.
Figure 3:
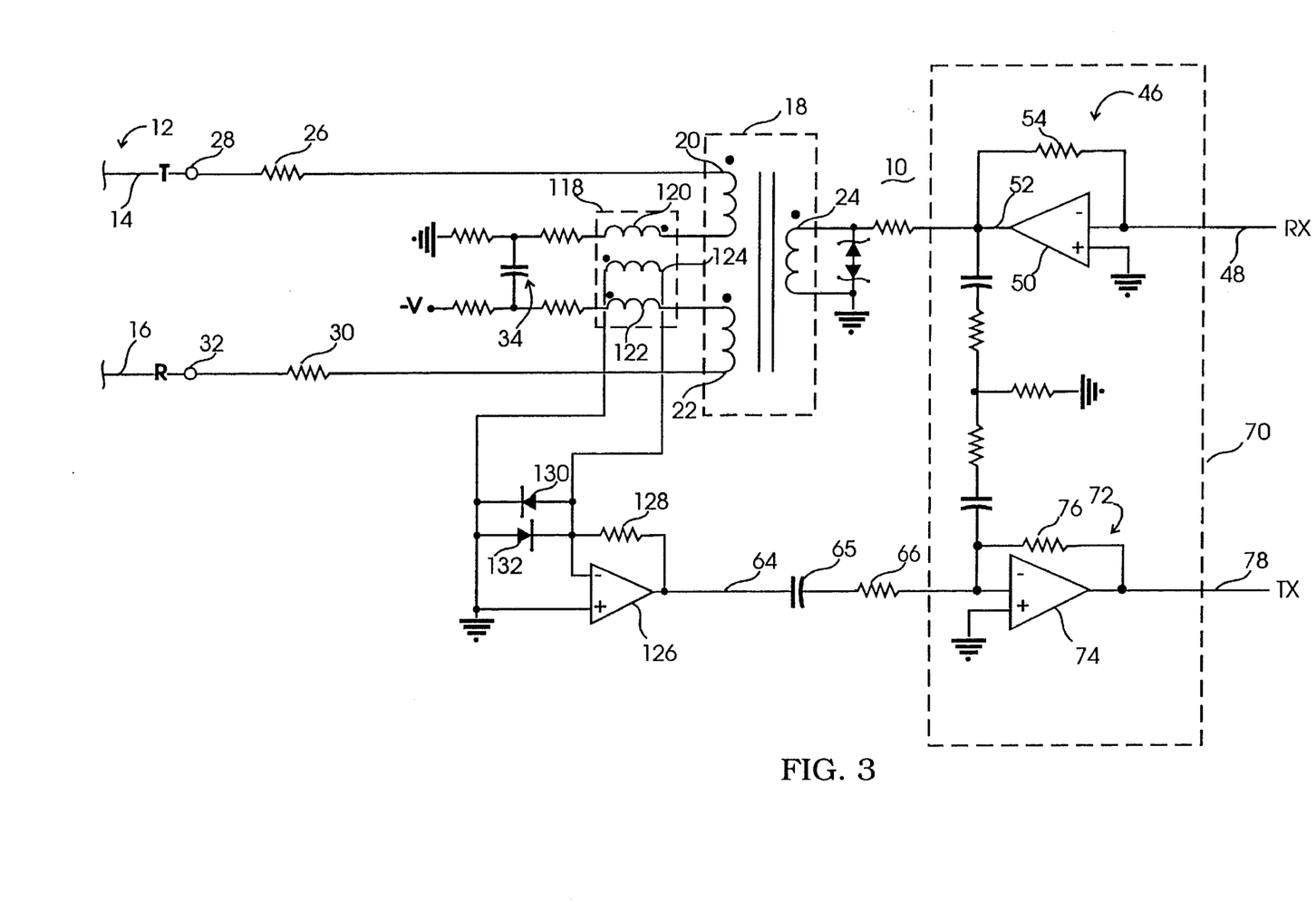
FIG. 3 is a telephone line feed circuit similar to FIG. 1, but including a transformer current sense circuit.

The current sense amplifier circuit 60 can be either a resistor/integrated circuit (FIG. 2), a transformer/ amplifier circuit (FIG. 3), or can be a combination of these two types of circuits (FIG. 4) to achieve or emphasize certain characteristics. The foregoing current sense amplifier circuit 60 can provide satisfactory longitudinal balance to the telephone line 12 when the resistor values of a resistor network are closely matched. Although closely matched resistors can be readily manufactured, such components can be somewhat costly. However, by utilizing resistor networks and integrated circuits for the current sense amplifier circuit 60, the printed circuit board area required of the same can be quite small. As an alternative, a separate transformer may be utilized in the primary circuit of line feed transformer 18 to sense the small AC voice signals on the telephone line 12. Such a circuit is shown in FIG. 3 of U.S. Pat. No. 4,982,426 by Jakab. However, this alternative requires an additional transformer and, although less costly than matched resistors and provides excellent common mode rejection, it requires substantially more space on a printed circuit board.

AC signals sensed by the current sense amplifier circuit 60 are coupled on conductor 64 through a series capacitor 65 and resistor 66 to a hybrid 70 that includes the receive signal amplifier 46 and a hybrid transmit amplifier 72. The hybrid 70 functions in the conventional manner, insofar as transmit and receive signals are processed separately on different lines on the secondary side of the transformer 18, but are carried on the same line on the primary side of the transformer 18. Voice or other signals transmitted from a destination on the telephone line 12 to the line feed circuit 10 are sensed by the current sense amplifier circuit 60 and coupled on conductor 64 to the transmit amplifier 72. The transmit amplifier 72 includes a differential amplifier 74 and a feedback resistor 76 establishing the gain of the hybrid transmit circuit 72. The transmit amplifier 72 transmits signals received by the line feed circuit 10 on a transmit (TX) conductor 78. The inverting input of the transmit amplifier 72 is connected through a series resistor 80 and capacitor 82 network to the low impedance output of the hybrid receive amplifier 46. As with hybrid circuits in general, the hybrid 70 utilized with the invention provides a substantially large trans-hybrid loss, i.e., high isolation between the signals on the receive conductor 48 and on the transmit conductor 78. In other words, the purpose of the hybrid 70 is to prevent the signals received on receive conductor 48 from passing through the transformer 18 to the telephone line 12, and be received by the current sense amplifier circuit 60 and passed to the transmit conductor 78 via the transmit amplifier 72. However, signals received from a destination on the telephone line 12 are sensed by the current sense amplifier circuit 60 and passed by the transmit amplifier 72 to the transmit conductor 78, all unattenuated.

In order to accomplish this hybrid function, signals received on conductor 48 and amplified by the receive amplifier 46 are coupled through the resistor 80 and capacitor 82 arrangement to hybrid node 84 with an opposite polarity, as compared to the same signals coupled by the current sense amplifier circuit 60 and passed through the capacitor 65 and resistor 66 combination to the node 84. Further, the signal amplitudes coupled to the node 84 by way of receive amplifier 46 and by the current sense amplifier circuit 60 are of the same amplitude, but opposite polarity, so that such signals cancel and essentially no receive signal remains at the inverting input of the transmit amplifier 74. The out-of-phase relationship between the signals coupled to the node 84 can be by way of inversion via the transformer 18, or by inversion in the current sense amplifier circuit 60.

On the other hand, when the telephone line feed circuit 10 receives voice signals from the destination on the telephone line 12, such signals are coupled by the current sense amplifier circuit 60 to the inverting input of the transmit amplifier 74, without any canceling signal provided through the resistor 80, capacitor 82 arrangement via the receive amplifier 46. Accordingly, signals received by the line feed circuit 10 from the telephone line 12 are amplified by the gain of the transmit amplifier 72 and passed to the transmit conductor 78. In this manner, the hybrid 70 functions with a high trans-hybrid loss, thereby maintaining isolation between the receive and transmit signals. It should further be noted that with the arrangement set forth in FIG. 1, there is no need for a complex hybrid balance network, as required in conventional bridge-type hybrid circuits.

In accordance with the preferred embodiment of the invention, four telephone line feed circuits can be mounted on one printed circuit board of size 4×9 inches, with other associated circuits, utilizing an area that heretofore could accommodate only two conventional line feed circuits. The line feed circuits of the invention can be made more compact primarily because of the small size required of the transformer 18 and the attendant savings in space. Because the transformer 18 requires only a small inductance, as compared to the prior art circuits, while yet maintaining the requisite low frequency response, the physical size of the transformer can be made much smaller. The transformer 18 utilized in conjunction with the invention, is made with 42 AWG copper wire as the primary windings 20 and 22, and 42 AWG copper wire as the secondary winding 24, all wound around a plastic bobbin over which a ferrite core is inserted. The transformer conductors are made with ordinary copper magnet wire having about 1.66 ohms per foot of resistance. Hence, no special materials are required in the fabrication of the transformer 18. The transformer is wound with a 1:1 ratio between the split primary and secondary windings. The primary split windings 20 and 22 are constructed with a wire size such that a 50 milliamp maximum line current can be carried with the shortest possible loops of the telephone line 12.

In accordance with one feature of the invention, the single secondary winding 24 is wound first around a plastic bobbin, and then the bifilar primary windings 20 and 22 are wound over the secondary. As a result, the length of the secondary winding is physically shorter than that of the primary winding, as the secondary is wound first on the bobbin and thus has a shorter circumference. Hence, the resistance of the secondary circuit is made even smaller, due to the overall shorter length of the secondary winding. This technique is not conventional, as it is preferred to wind the double bifilar primary conductors together on the smooth bobbin shaft, and then wind the single secondary winding thereover.

The foregoing line feed transformer is wound with 1000 turns in the secondary and 500 turns in each winding of the split primary, resulting in a 1:1 turns ratio. The transformer has a total primary inductance of 100mh and a secondary inductance of 100 mh. The transformer is square and has an overall small physical dimension of about 1.3 cm ×1.3 cm×1.3 cm. By using such type of transformer with corresponding transmit/receive circuitry, and with forward line feed resistors, an economical and compact line feed circuit can be realized. Further, by utilizing a line feed transformer, supply voltage headroom is not a concern.

Another transformer formed according to the convention is cylindrical in shape with a outside core diameter of 18 mm, and 11 mm tall. This transformer was wound with a 2:1 ratio, with 1120 secondary turns of a 40AWG ordinary copper magnet wire (1.08 ohm/foot), and split primary windings each hearing 280 turns of the same type of wire. The secondary inductance was 200 mh and the primary inductance was 50 mh. Such type of line feed transformer is well adapted for use with very small voice signals (0 dbm into 900 ohm), and 50ma DC line currents. By use of flux cancellation techniques that are described below, the line feed transformers of the invention can be made even smaller in physical size.

In accordance with another feature of the invention, a major portion of the resistive line termination is external to the line feed transformer 18, thereby protecting the transformer from surges on the telephone line 12. In the preferred form of the invention, the line feed resistors 26 and 30 are discrete resistors each having a value of about 402 ohms, totalling about 804 ohms. This represents about 90% of the total 900 ohm terminating impedance. Further, the resistance of the split primary windings 20 and 22 is about 35 ohms each, totaling about 70 ohms. Should a lightning strike cause a voltage surge to be applied to the telephone line 12, a major part of the surge voltage will be developed across the forward line feed resistors 26 and 30, and a remaining small voltage will be applied across the primary of the transformer 18. The line feed resistors 26 and 30 should thus be of a sufficient power rating to dissipate the heat energy developed by the surge voltage. However, if a sustained over voltage is maintained across the telephone line 12, such that the energy dissipation of the line feed circuit is too excessive, the forward line feed resistors 26 and 30 will fail as open circuit components, rather than the more disastrous short circuit failures common to transformers. With this arrangement, much less power is developed across the primary of the transformer 18, thus reducing the power dissipation requirements of the transformer. Additionally, the electrical insulation between the windings of the transformer 18 can also be made less critical, as less voltage is developed across the windings thereof. By reducing the power dissipation requirements as well as the electrical insulation requirements, the transformer 18 can be made correspondingly smaller. By also requiring less transformer inductance, for the reasons noted above, the transformer can be made of smaller size by virtue of this advantage also. Hence, a telephone line feed circuit incorporating these advantages can be made very compact and efficient, both as to cost and space.

As noted above, the size of the line feed transformer 18 can be made extremely small, but without compromising circuit performance. In practice, a telephone line feed circuit incorporating four of the circuits shown in FIG. 1, as well as additional necessary circuits, can be assembled on a single printed circuit board having dimensions of about four inches by nine inches.

As noted above, the current sense amplifier circuit 60 can be implemented as different circuits to realize certain advantages, such as high common mode rejection, cost, space, performance, etc. One embodiment of a current sense amplifier circuit can be a precision resistor and integrated circuit amplifier configuration. Such a configuration is illustrated in FIG. 2. In this arrangement a number of precision resistors and an operational amplifier are connected across the forward line feed resistors 26 and 30 to sense both the DC line current and the AC voice signals. Such an arrangement provides adequate common mode rejection, and requires only a small circuit board space.

In the current sense amplifier circuit 60 of FIG. 2, high resistance value resistors 92 and 94 are connected across the line feed resistor 26 to the respective noninverting and inverting inputs of a differential amplifier 96. High resistance resistors 98 and 100 are connected across the other line feed resistor 30, also to the respective noninverting and inverting inputs of the differential amplifier 96. The resistors 92 and 100 are connected together at a summing node 102 to the noninverting input of the amplifier 96, while the resistors 94 and 98 are connected to a summing node 104 to the inverting input of amplifier 96. Resistors 106 and 108 are connected from the summing node 102 to ground to provide a resistance divider to ground. A feedback resistor 110 establishes the gain of the amplifier 96. An additional shunt resistor 112 is connected between the summing node 104 and ground.

The resistor/amplifier current sense amplifier 60 of FIG. 2 is effective to amplify any transmit or receive voice signals on the telephone line 12, and provide corresponding voice signals on conductor 64. The hybrid 70 function to cancel any receive signals transmitted on the line 12 by the transformer 18, so that such signals are not retransmitted by the hybrid transmit amplifier 74 on the TX line 78. The current sense amplifier circuit 60 senses DC line currents and provides corresponding signals on line 62.

FIG. 3 depicts a transformer-type current sense amplifier circuit utilized in conjunction with the resistance forward line feed circuit of the invention. In this configuration, a current sense transformer 118 is connected in the primary circuit of the line feed transformer 18. The current sense transformer 118 includes a winding 120 connected in series with the split primary winding 20 of the line feed transformer 18. Similarly, a current sense winding 122 is connected in series with the split primary winding 22 of the line feed transformer 18. Both current sense windings 120 and 122 are connected through respective resistors to ground and to the negative supply voltage. A coupling capacitor 34 provides a low impedance path for voice signals between the split primary windings 20 and 22, through the current sense windings 120 and 122. A secondary winding 124 of the current sense transformer 118 is connected to the inverting and noninverting inputs of a differential amplifier 126. The differential amplifier 126 amplifies both the transmit and receive voice signals coupled in the line feed current transformer primaries 20 and 22, with a gain determined by the value of feedback resistor 128. The amplified voice signals are coupled on line 64 to the hybrid 70, and processed in the manner described above. A pair of diodes 130 and 132 having polarities shown in FIG. 3, protect the differential inputs of the amplifier 126 against excessive voltages.

The current sense arrangement shown in FIG. 3 provides a high degree of common mode rejection, e.g., better than 90 db. While an additional transformer is required in the configuration shown in FIG. 3, it is noted that the line feed circuit of the invention is versatile and can accommodate many types of circuits connected therewith. It should also be noted that the forward line feed resistors 26 and 30 protect both the line feed transformer 18 and the current sense transformer 118 from over voltage conditions on the telephone line 12. The current sense transformer 118 is small in physical size, being about 1.0 cubic centimeter.

Figure 4:
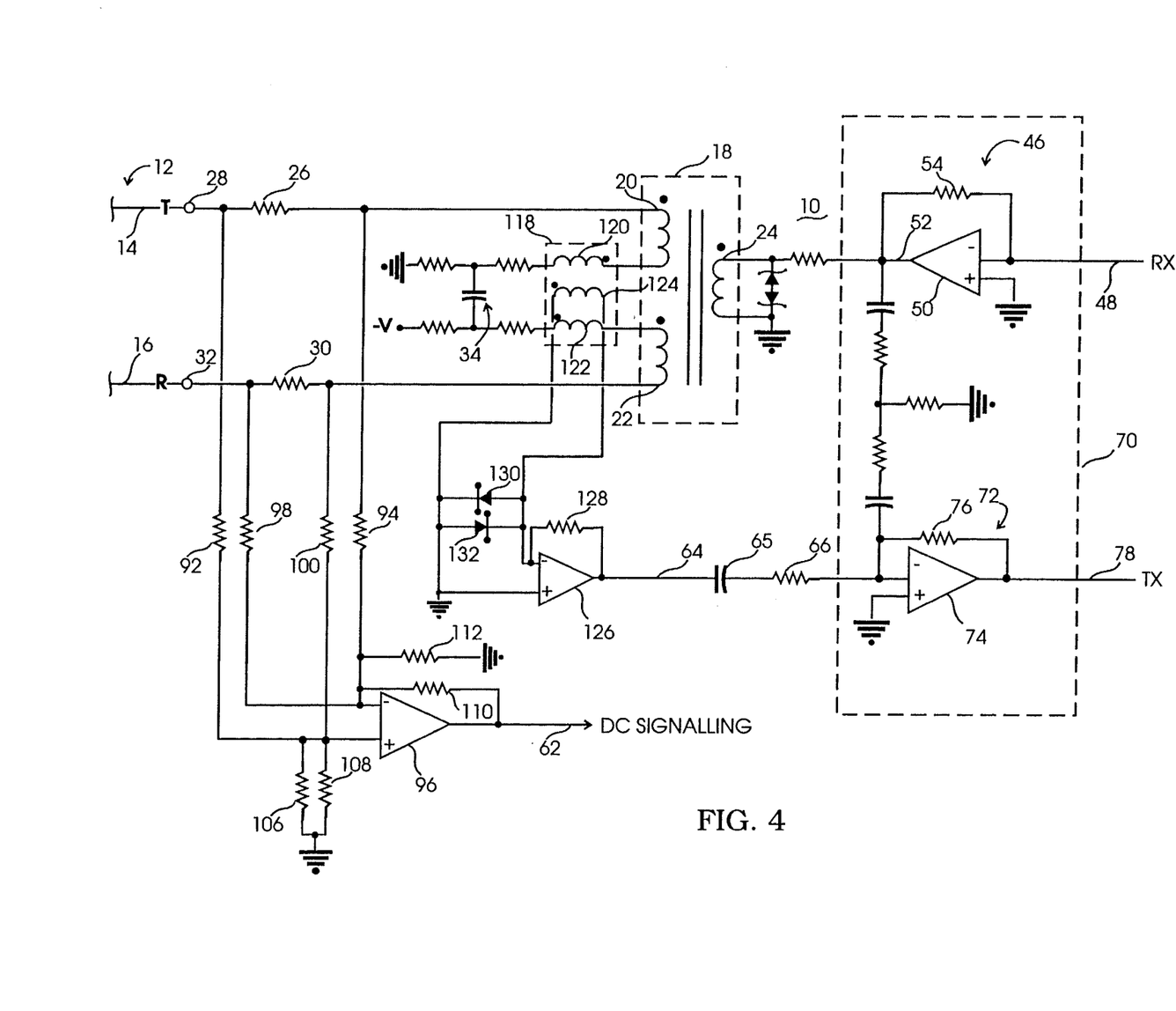
FIG. 4 is a telephone line feed circuit similar to FIG. 1, but incorporating the current sense circuits of FIG. 2 and 3.

The current sense amplifier circuit arrangements of FIGS. 2 and 3 can be combined, such as shown in FIG. 4. Here, the current sense transformer 118 is utilized in combination with the differential amplifier 126. The current sense transformer circuit provides voice signal sensing capabilities with excellent common mode rejection performance. In addition, the matched resistors 92–94 can be utilized in combination with the differential amplifier 96 to sense the DC currents through the forward line feed resistors 26 and 30 to provide DC signalling. The matching of the resistors associated with amplifier 96 can be accomplished with less precision, thereby reducing costs of the circuit. Those skilled in the art may prefer to utilize yet other current sense circuits in conjunction with the invention.

Figure 5:
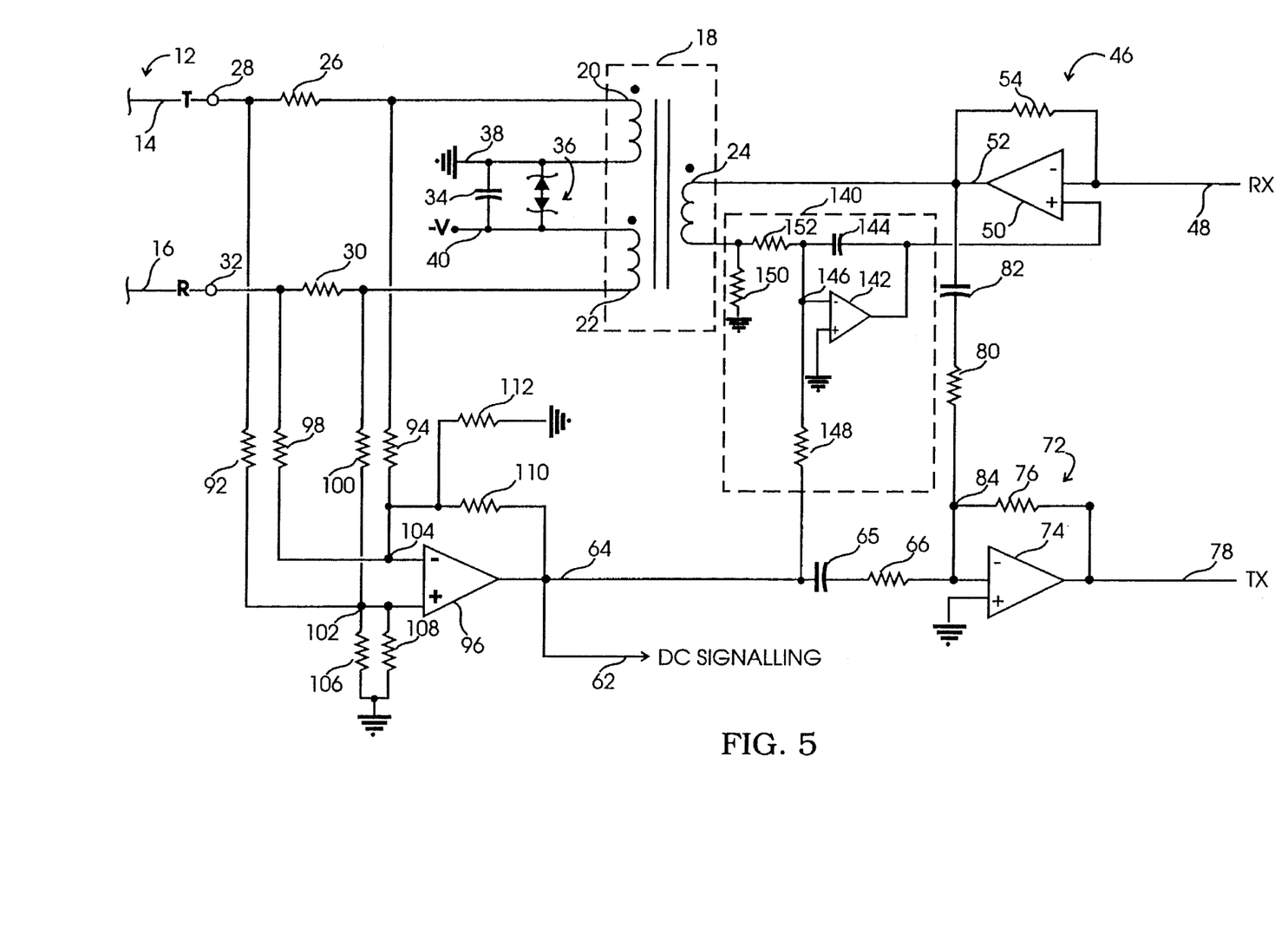
FIG. 5 is an electrical schematic diagram similar to FIG. 2, but including a flux cancellation circuit.

With reference to FIG. 5, there is illustrated the same basic telephone line feed circuit shown in FIG. 2, but also includes a flux cancellation circuit designated as reference numeral 140. The flux cancellation circuit 140 may be utilized in accordance with the invention to further reduce the size of the line feed transformer 18. The size of a transformer 18, and especially the magnetic core, is determined in part by the DC current capability and the magnetizing inductance. In order for a transformer 18 to produce magnetic fields in response to currents, the core of the transformer must not become saturated. If saturated, the core of the transformer represents a low impedance path to ground for all signals. As noted in FIG. 5, the line feed circuit transformer primary carries the 18–50 milliamp current that flows in the telephone line 12 during the off-hook condition when bidirectional voice signals are also carried. Not only does the core of the line feed transformer 18 maintain a magnetic flux due to the DC current, the AC voice currents also produce smaller AC signals that must be passed through the transformer via magnetic flux coupling to the secondary 24, and vice versa. The flux cancellation circuit 140 is effective to reduce the DC magnetizing flux in the line feed transformer 18, thus allowing the transformer to be made with a physically small size.

The flux cancellation circuit 140 includes an integrating amplifier 142 having a feedback capacitor 144. The output of the integrating amplifier 142 is coupled to a noninverting input of the hybrid receive amplifier 50. The noninverting input of the integrating amplifier 142 is connected to ground, while the inverting input is connected to a summing node 146. As noted above, the DC current in the transformer primary windings 20 and 22 is sensed by the current sense amplifier 96 and associated resistor circuits to produce a corresponding DC voltage on conductor 62. AC voice signals are superimposed with the DC voltage on conductor 64. A resistor 148 couples a current corresponding to the DC primary current to the summing node 146 of the integrating amplifier 142. A small resistor 150, on the order of 10 ohms, is connected to the transformer secondary 24 to sense the DC current passing therethrough to ground. The voltage developed by the small resistor 150 is coupled through a summing resistor 152 to the summing node 146. The output of the integrating amplifier 142 provides an integrated DC bias to the receive amplifier 50 so that a DC current is produced in the transformer secondary 24, out of phase and proportional to the DC current in the primary windings 20 and 22. Depending upon the transformer winding ratio, the DC currents of the primary and secondary windings need not be equal in magnitude. With this arrangement, the magnetic flux produced in the transformer core by the DC line current flowing through the primary windings 20 and 22 is offset and reduced substantially to zero by an opposite phase magnetic flux induced in the transformer core by the secondary winding 24. By appropriate adjustment of the values of resistors 152 and 148, cancellation of the DC flux in the transformer core can be reduced substantially to zero. This allows the transformer core to be made physically smaller so as to accommodate only the AC signals.

Figure 6:
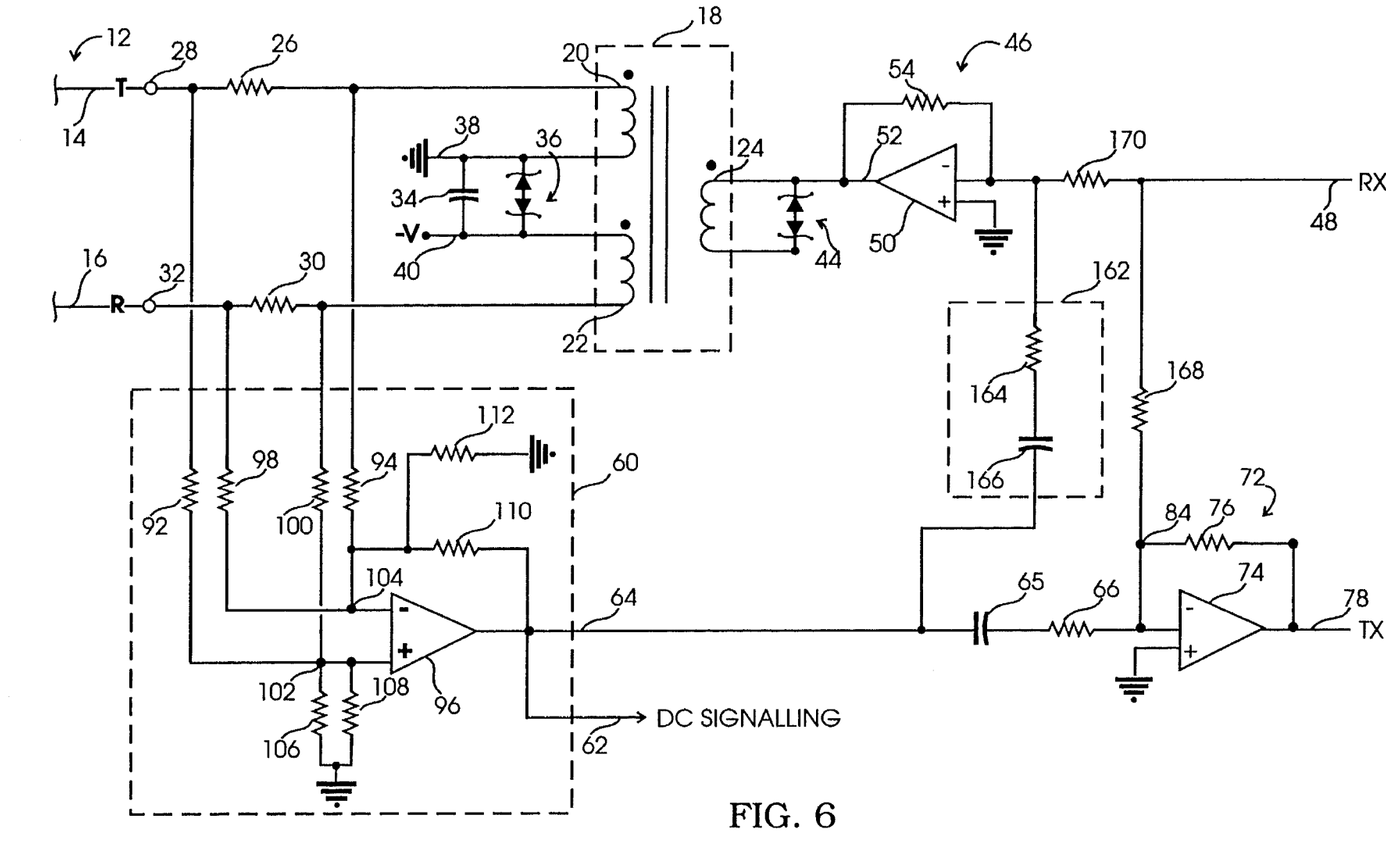
FIG. 6 is a circuit diagram similar to FIG. 2, but including an impedance synthesis circuit.

FIG. 6 illustrates yet another embodiment of the invention. The telephone line feed circuit 160 of this embodiment includes an impedance synthesis network 162 connected between the input of the hybrid transmit amplifier 74 and the input of the hybrid receive amplifier 50. Impedance synthesis is desirable because the energy dissipated in resistances, such as the line feed resistors 26 and 30, can be reduced, while yet maintaining the standard line terminating impedance of 900 ohms. In addition, in those applications where a battery voltage lower than the standard −48 volts is utilized, the line feed resistors 26 and 30 can be reduced in value to allow the standard 18–50 milliamps line current, while yet maintaining the standard 900 ohm terminating impedance, by using the impedance synthesizing circuits.

In accordance with the impedance synthesis circuit 162 of the invention, the current sense amplifier 96 and associated resistor circuitry senses the line current and provides a corresponding voltage on conductor 64. If an impedance is to be synthesized, as compared to a resistance, then the circuit 162 should be characterized by the corresponding impedance. In FIG. 6, the synthesis network 162 includes a resistor 164 in series with a capacitor 166 for synthesizing a capacitive reactance. The values of the resistor 164 and the capacitor 166 should be chosen such that the time constant is well below 80 Hz, a lower bound for the telephone voice frequency spectrum. As further noted, the resistive component to be synthesized is not inserted in the line feed transformer secondary circuit, otherwise such increased resistance would require a larger transformer inductance. Since the synthesis circuit 162 includes a series capacitor 166, it is the AC signals sensed by the current sense amplifier 96 that are utilized for synthesizing an impedance that is reflected from the transformer secondary to the primary. Essentially, the synthesis network 162 increases the output impedance of the receive amplifier 50, which increased impedence is reflected to the transformer primary. Insofar as the current sense amplifier 96 functions to convert a sensed current into a corresponding output voltage, such amplifier is known as a trans-resistance amplifier. The impedance to be synthesized, and more particularly, a resistance, can be calculated according to the following equation $R_{SYNTHESIZED}=A(R_{164}/R_{54})$. Here, the synthesized resistance is the ratio of the resistance between that of the synthesis network 162 and the feedback resistor 54 of the receive amplifier 50, times the gain of the trans-resistance amplifier 96. In connection with the hybrid function, the output of the receive amplifier 50 is no longer coupled to the input of the transmit amplifier 74. Rather, the receive conductor 48 is connected by way of a resistor 168 to the inverting input of the transmit amplifier 74. In this manner, signals from the receive line 48 cancel at node 84 the receive signals sensed by the amplifier 96, and thus provide essentially a null signal to the input of the transmit amplifier 74 when the circuit is actively receiving signals on the RX conductor 48. A resistor 170 couples signals from the receive conductor 48 to the inverting input of the receive amplifier 50.

Because the line feed transformer secondary 24 is driven with a voltage by the receive amplifier 50, the impedance synthesis circuit is less sensitive to the shunt inductance of the secondary. Accordingly, by utilizing an impedance synthesis circuit that senses telephone line current and drives the transformer secondary with a voltage, any additional current required from the amplifier output to drive the shunt inductance does not otherwise affect the circuit operation. This contrasts with voltage sense and current drive impedance synthesis circuits that operate into low impedance circuits having shunt inductances, which results in reduced performance.

From the foregoing, disclosed is a telephone line feed circuit that is of a noncomplex design, affords the use of a very small transformer, and provides substantial lightning protection to the transformer. The transformer secondary is characterized by a low resistance, and is driven by a low impedance output amplifier, thus reducing the constraints for large transformer inductances. Because the transformer secondary reflects very little resistance or impedance to the primary, the major line terminating resistances are discrete resistors placed in series between the transformer and the telephone tip and ring conductors. Any substantial voltage surges on the telephone line are absorbed by the line feed resistors, and reduced amplitude voltages appear across the transformer primary. The line feed circuit of the invention need only be a single transformer, and can be made very small because of the reduced inductance and electrical isolation between the windings. Further, since the resistance of the transformer windings is reduced, less power in the nature of heat is dissipated therein, thus extending the life of the transformer.

The line feed circuit of the invention can be modified to include flux cancellation circuits for further reducing the size of the transformer core to reduce the possibility of saturation thereof. The resistance of the forward line feed resistors can be reduced in value by utilizing impedance synthesis circuits, while yet maintaining the required terminating impedance to the telephone line. As noted above, one or more of the features of the invention can be utilized, without departing from the spirit and scope of the invention.

While the preferred and other embodiments of the invention have been disclosed with reference to specific line feed circuits and methods of operation thereof, it is to be understood that many changes in detail may be made as a matter of engineering choices, without departing from the spirit and scope of the invention, as defined by the appended claims.

What is claimed is:

1. A telephone line feed circuit for use with a telecommunication line, comprising:

a transformer having a primary and secondary winding wound with low resistance conductors;

a first discrete resistor connected in series with a tip terminal of the primary winding, and a second discrete resistor connected in series with a ring terminal of the primary winding, a sum of said first and second resistors having a value providing more than about 50% of a termination impedance of the telephone line feed circuit to the telecommunication line while yet maintaining an impedance match between the telecommunications line and the telephone line feed circuit; and a receive amplifier having a low impedance output connected to the transformer secondary winding for driving the transformer secondary winding directly with substantially no resistance therebetween.

2. The telephone line feed circuit of claim 1, wherein said transformer includes a telecommunication line battery voltage supplied to the primary winding.

3. The telephone line feed circuit of claim 1, wherein said secondary winding has no more than about 30 ohms of wire resistance.

4. The telephone line feed circuit of claim 1, wherein said transformer has an inductance of no more than about 0.15 Henry.

5. The telephone line feed circuit of claim 1, wherein the first and second discrete resistors are about 400 ohms each.

6. The telephone line feed circuit of claim 1, further including:

a line current sensing circuit connected to the transformer primary for sensing voice signals;

a transmit amplifier receiving voice signals from the current sensing circuit and providing output voice signals; and an RC circuit connected between said transmit amplifier and said receive amplifier to prevent receive signals from being amplified by said transmit amplifier.

7. The telephone line feed circuit of claim 6, further including a flux cancellation circuit connected between an output of the line current sensing circuit and the receive amplifier, said flux cancellation circuit including an integrator amplifier sensing a DC component of current flowing through the transformer primary, and providing a DC bias to said receive amplifier to establish a DC magnetic field in the transformer secondary that offsets a DC magnetic field in the transformer primary caused by said DC component of current.

8. The telephone line feed circuit of claim 7, wherein said flux cancellation circuit includes a summing node for receiving signals from the transformer secondary and from the current sensing circuit, and includes a feedback capacitor with said integrator amplifier to integrate and remove voice signals therefrom.

9. The telephone line feed circuit of claim 6, further including an impedance synthesis circuit comprising an impedance network coupled between an output of the line current sensing circuit and the receive amplifier.

10. The telephone line feed circuit of claim 9, wherein said impedance synthesis circuit synthesizes an impedance by sensing a current in the telecommunication line and driving the transformer secondary with a corresponding voltage.

11. The telephone line feed circuit of claim 1, further including a line current sensing circuit which comprises a differential amplifier having an inverting input and a non-inverting input, a resistor network for sensing line currents and voice currents passing through the first and second discrete resistors, and a summing node connecting the resistor network to each respective input of the differential amplifier, whereby an output of the differential amplifier provides DC signalling of a DC state of the telecommunication line, and provides AC voice signals to a transmit amplifier.

12. The telephone line feed circuit of claim 1, wherein said transformer has a primary and secondary winding wound around a bobbin, and wherein the secondary is wound around a center core of the bobbin, and the primary is then wound around and thus on the outside of the secondary, whereby the transformer secondary conductor being on the inside has a length that is shorter per turn than a length of the transformer primary per turn which is wound on the outside of the transformer secondary.

13. The telephone line feed circuit of claim 1, further including a current sensing transformer connected to the transformer primary for sensing voice signals carried by the telecommunication line, and a resistor network and amplifier arrangement connected across said first and second resistors for sensing DC current flow in the telecommunication line.

14. The telephone line feed circuit of claim 1, wherein said first and second resistors have combined valves that define at least 75 percent of a termination impedance of the telecommunication line.

15. A method of making a multiple telephone line feed circuit for coupling to respective telecommunication lines, comprising the steps of:

fabricating a plurality of line interface circuits on a single printed circuit board including a line feed transformer in association with each of said line interface circuits;

fabricating each transformer with a low resistance conductor in a primary and secondary winding, each conductor having two ends;

connecting an output of each of a plurality of low impedance output amplifiers directly to a respective transformer secondary winding with substantially no resistance therebetween; and connecting a resistor between each transformer primary conductor end and a respective terminal to which a respective telephone line tip and ring conductor is connectable, said resistors of each primary conductor being selected to represent a majority of an impedance to which the respective telephone line is to be matched.

16. The method of claim 15, wherein said resistors of each primary conductor have a value that represents at least 75 percent of the total line termination impedance.

17. The method of claim 15, wherein said resistors are about 400 ohms each.

18. The method of claim 15, further including winding the transformer so as to have a secondary inductance of about 0.01 Henry.

19. The method of claim 18, further including winding the transformer so as to have a primary inductance of about 0.025 Henry.

20. The method of claim 15, further including winding the transformer primary winding over said secondary winding, whereby each turn of the secondary is shorter in length than each turn of the primary.

* * * * *